United States Patent [19]

Voigt

[11] 4,289,716
[45] Sep. 15, 1981

[54] THERMALLY INSULATING TUBES

[75] Inventor: Hermann U. Voigt, Langenhagen, Fed. Rep. of Germany

[73] Assignee: Kabel- und Metallwerke Gutehoffnungshutte A.G., Hanover, Fed. Rep. of Germany

[21] Appl. No.: 12,248

[22] Filed: Feb. 14, 1979

[30] Foreign Application Priority Data

Feb. 16, 1978 [DE] Fed. Rep. of Germany ....... 2806560

[51] Int. Cl.³ ............................................ B29D 27/00
[52] U.S. Cl. .................... 264/45.9; 264/46.9; 264/54; 264/68; 264/173; 264/209.3; 264/DIG. 18; 264/209.6; 425/113; 425/817 C
[58] Field of Search ...................... 264/45.9, 46.9, 51, 264/53, 50, DIG. 18, 123, 209, 54, 68; 425/817 C, 113

[56] References Cited

U.S. PATENT DOCUMENTS

| | | | |
|---|---|---|---|
| 2,928,130 | 3/1960 | Gray | 264/50 |
| 2,994,327 | 8/1961 | Otto et al. | 264/45.9 X |
| 3,528,458 | 9/1970 | Gaeckel | 264/45.9 X |
| 3,606,635 | 9/1971 | Benteler et al. | 264/46.1 X |
| 3,706,683 | 12/1972 | Vogt et al. | 264/DIG. 18 |
| 3,937,447 | 2/1976 | Alwes et al. | 264/68 |
| 3,940,467 | 2/1976 | Brachman | 264/53 X |
| 3,956,438 | 5/1976 | Schippers | 264/53 X |
| 4,048,275 | 9/1977 | Usamoto et al. | 264/DIG. 18 |
| 4,073,844 | 2/1978 | Wada et al. | 264/DIG. 18 |

FOREIGN PATENT DOCUMENTS

| | | | |
|---|---|---|---|
| 2500972 | 7/1976 | Fed. Rep. of Germany | 264/53 |
| 2525561 | 12/1976 | Fed. Rep. of Germany | 264/45.9 |
| 48-5265 | 2/1973 | Japan | 264/DIG. 18 |
| 1303643 | 1/1973 | United Kingdom | 264/DIG. 18 |
| 1480324 | 7/1977 | United Kingdom | 264/DIG. 18 |

OTHER PUBLICATIONS

"Websters's New Collegiate Dictionary", Springfield, Mass., G. & C. Merriam Co., ©1961, pp. 91, 98, 138 and 139.
Whittington, Lloyd R., "Whittington's Dictionary of Plastics", Stamford, Conn., Technomic, ©1968, Preface, pp. 98, 155, 179, 180, 181.
"Wire and Cable Coaters' Handbook", First Edition, Wilmington, Del., E. I. DuPont de Nemours and Co., Inc. ©1968, pp. 13-22.

Primary Examiner—Philip Anderson
Attorney, Agent, or Firm—Smyth, Pavitt, Siegemund & Martella

[57] ABSTRACT

A blend of high and low density polyethylene and azodicarbonamid added as blowing agent is heated in an extruder to a temperature above the melting point of the high density component and fed to a shear head having a hollow rotating mandrel through which tubing is fed for depositing thereon a hose at the nozzle exit of the head. A peroxide is fed to the shear head for mixing with the polymer blend and immediately initiating crosslinking; blowing begins just prior to the depositing, the material being already crosslinked to a considerable extent.

11 Claims, 1 Drawing Figure

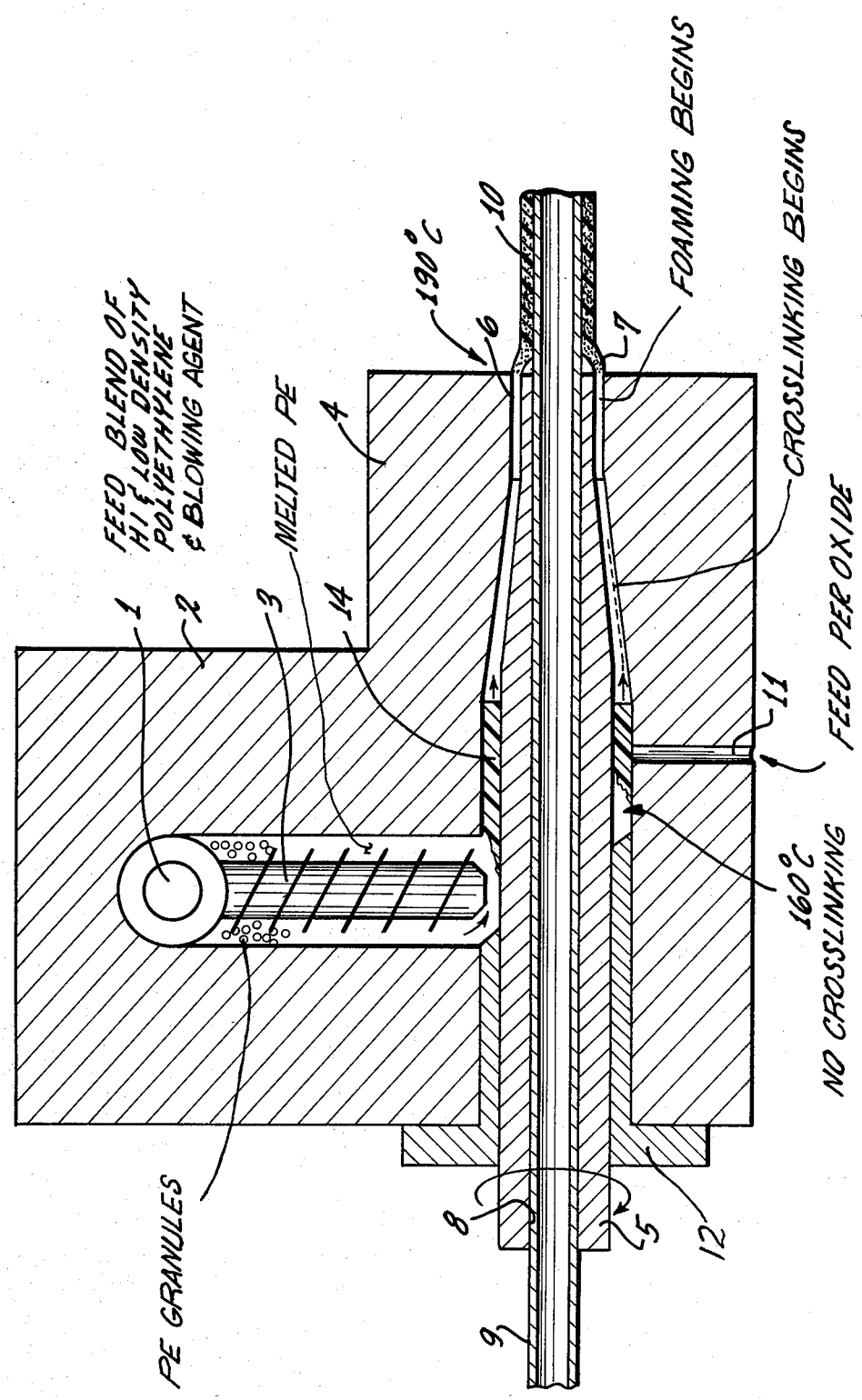

THERMALLY INSULATING TUBES

BACKGROUND OF THE INVENTION

The present invention relates to the continuous production of thermally insulated conduits and tubes.

The German printed patent application No. 2,525,561 discloses a method of thermally insulating a metal tube by means of a crosslinked and foamed plastic jacket. A thermoplastic powder or granulate is mixed with a blowing, expanding or foaming agent as well as with crosslinking agents and is heated in a blender or an extruder. A fast rotating shear head increases the temperature above the reaction temperatures of the crosslinking and blowing additives so that the plastic is crosslinked at first, followed by expanding into a cellular configuration and texture.

The method as described was used particularly on an experimental basis, to melt a mixture of high density polyethylene and low density polyethylene, includes at least 50% of the high density component, melting to take place in the presence of a peroxide and in an extruder so that a shear head can be charged with a homogenic blend. The pressure of the flowing or fluid mass was measured right in front of the entrance to the head and was found to vary to a considerable extent. It is believed that these pressure variations originate in pulsations of and in an inhomogenic melt upstream from this shear head exit and containing molten substance mixed with not yet or partially molten granules.

The melt is believed to be inhomogenic due to the different melting temperatures of high and low density plastic. Particularly the melting point of high density polyethylene is rather high (about 130°) while peroxide begins to become reactive towards formation of radicals at temperatures not much above 130° C., so that the polymers begin to crosslink. Crosslinking begins prematurely in the sense that molecules in the liquid phase crosslink while high density granules are still not melted. In order to prevent such premature crosslinking prior to complete melting of the polyethylene blend, one must operate in a very limited temperature range. Low density polyethylene by itself melts already at about 110° C. so that the permissible operating range is significantly larger. The problem above arises from a higher melting point of high density polyethylene. It is, therefor, not surprising that the employment of high density polyethylene has been more or less avoided. Large scale processing makes it difficult to impossible to maintain a sufficiently narrow temperature range above 130° C. but below the onset of crosslinking. Nevertheless, low density polyethylene by itself is fairly weak mechanically so that some higher density polyethylene should be added to strengthen the foamed coating. This is particularly true for sphereodized copper tubes, jacketed in foam plastic. That plastic jacket should be strong but not so stiff so as to resist bending of the tube for installation.

DESCRIPTION OF THE INVENTION

It is an object of the present invention to provide a new and improved method of jacketing tubes in foamed crosslinked plastic without requiring extremely critical temperature control in the melting and application process.

It is another object of the present invention to improve the control of overlapping foaming and crosslinking of a polymer as it is deposited, e.g. on a tube.

It is a specific object of the present invention to crosslink and foam a blend of high and low density polyethylene as it is applied to a tube as a jacket to foam and cure in situ.

In accordance with the present invention, it is suggested to maintain the practice of heating the polymer, e.g. a blend of high and low density polyethylene in a mixer or extruder which blend contains also the foaming agent. Also, the melted plastic is passed to and through a shear head from which the material is applied to a tube, and the plastic is also to be heated to pass through the head at a temperature above the decomposition or reaction temperature for the blowing or foaming agent. However, unlike the usual practice, the crosslinking agent for the polymer is added in liquid form to the melted material in the shear head and at a point in which the polymer blend has not yet reached the reaction temperature for blowing. Rather, as the liquidous crosslinking agent is being injected, the plastic has already a temperature which is close to or even in excess of the temperature in which crosslinking begins. This procedure, in turn, permits heating of the melted blend in locations well ahead of the head's exit temperature well above the melting point of all polymer components.

As a consequence of the inventive method, onset of crosslinking and onset of foaming can be more conveniently spaced in time and predetermined. The temperature range available is quite large, e.g. 30° to 40° even though crosslinking temperature is as low as the melting point. The main point is that the crosslinking agent be added after the blend has been raised in temperature sufficiently high so that all of its components have melted. The crosslinking agent may well be added at a point in the equipment which permits immediate onset of crosslinking. Thus, the onset of crosslinking is controlled in the sense that with certainty all of the plastic has melted. In other words that agent may be added when the plastic has even a higher than the lowest reaction temperature for forming radicals.

The foaming agent should be added so that it is very homogenically distributed; there is no danger that foaming occurs prematurely because its reaction temperature is naturally quite high. It is particularly suggested now to use a crosslinking agent that begins reaction at fairly low temperatures. This way, vigorous crosslinking is under way when the foaming begins.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

The FIGURE is a cross-section through an extruder in which and by means of which examples of the preferred embodiment can be practiced including the examples below.

Proceeding now to the detailed description of the drawing, the FIGURE illustrates an extruder 2 having a feed port 1 for charging the extruder with granulated polymer, e.g. a polymer base material, possibly a blend to which a blowing and expanding agent, and, possibly, other additives have been added, but any crosslinking agent has not been added. A feed worm 3 mixes and plastifies the blend while heating it to a temperature which is safely above the melting temperature of all components of the polymer, but clearly below the temperature at which foaming begins.

The extruder advances the material to a shear head 4 containing a rotatable mandrel 5 in a bore 14, restricting the bore to an annular channel. Particularly, the extruder feeds the material into the ring space between the mandrel and a cylindrical portion of bore 14 constituting a channel. The bore or channel as well as the mandrel have tapering portions and smaller diameter portions adjacent to an exit or mouth 6. The exit 6 is actually an annular mouth portion through which emerges the plastic in the shape of a shrinking tube 7.

Mandrel 5 is penetrated axially by a bore 8 concentric to annular channel 14, and a tube 9 to be coated and jacketed is passed into and through that bore 8. As a portion of the tube 7 emerges from the front end of the mandrel right at mouth 6 of head 4, the tube 7 is shrunken onto the tube 9.

The plastic as it is advanced inside channel 14 from the extruder exit to head mouth 6 is heated therein by means of the fast rotation of the mandrel. That rotation causes the plastic to undergo continuously shearing action. The resulting temperature and temperature increase can be quite accurately controlled via the rpm number of the mandrel. The temperature is specifically controlled so that the expanding or foaming temperature be reached just at exit 6. Generally speaking, the shear head raises the temperature of the plastic by an additional 30° to 40° C.

A plug element 12 prevents rearward flow of the plastic in channel 14 also having emerged from the extruder exit. A duct 11 leads to the channel 14 on the side opposite the extruder exit. The liquid crosslinking agent is fed to channel 14 through that duct. The fast rotation of the mandrel causes the crosslinking agent to be intimately mixed with the flowing plastic. This is an important aspect to be considered in detail. The temperature of the plastic is at or even above the reaction temperature of the crosslinking agent at the point of injection of the crosslinking agent. However, crosslinking does commence fairly slowly. The rotating mandrel makes sure that the crosslinking agent is uniformly distributed, the resulting eddies are quite sufficient. Even though crosslinking continues throughout the length of the channel 14, distribution of the agent continues also. The decisive aspect is that the crosslinking agent meets completely melted plastic.

The blend will have a temperature from, e.g. about 180° to 190° C. when reaching the exit 6. More generally, the temperature should be at or a little above the decomposition temperature of the blowing agent, so that it will begin to decompose, just before reaching the exit 6. The crosslinking agent became reactive earlier, i.e. at a lower temperature of the melt, so that crosslinking has progressed to a considerable extent when development of blowing gas for foaming begins. As the melted and pressurized substance emerges from mouth 6, the pressure drops to ambient and the material 7 having the configuration of a tube will readily expand and continue to crosslink to the extent possible by the amount of peroxide added for crosslinking, resulting in a foamed crosslinked jacket 10.

The following specific method may be practiced in the aforedescribed manner. A granulate or powder blend will be prepared in which low density and high density polyethylenes are mixed. As far as the inventive method is concerned, the proportions are not critical. However, as was outlined above, one should use a considerable amount of high density polyethylene simply for reasons of strength of the resulting product. On the other hand, too much high density polyethylene may render the product too rigid. In some cases that may not be a disadvantage, but whenever the tubing to be jacketed is to retain some flexibility, i.e. permit bending, a significant amount of low density polyethylene should be included.

As far as the invention is concerned, emphasis is placed on the high melting plastic such as high density polyethylene having a melting point that is rather close to the reaction temperature of a crosslinking agent. A ratio of equal amounts of high and low density polyethylene is a very useful product. The process requires little, if any modification for a higher or a lower mandrel or high density polyethylene, the mandrel may be run slower or faster. Decision or, when the blend has melted completely when charged from the extruder into the shear head. From a practical point of view, there should be at least about ten percent high density polyethylene.

Such a blend is further pre-mixed with azodicarbonamide as blowing agent. One may use, e.g. 2–3 parts by weight per one hundred parts by weight polyethylene blend. As stated, this blend will be completely melted at temperatures above 130° C.; it is assumed that the blend has a temperature of about 150° to 160° C. when emerging from the extruder 2, and is injected into channel 14. The particular foaming agent decomposes at temperatures above about 170° C.

The crosslinking agent, a peroxide, is added through duct 11. One may use here, for example, dibenzoylperoxide, or 1,1 ditertiary butylperoxi-3,3,5 trimethylcyclohexane; or tertiary butylperbenzoate. All these crosslinking agents begin to react for crosslinking at rather low temperatures, below the temperature of the plastic at the injection point (end of duct 11) which is about 160° C. Crosslinking proceeds at a rather rapid rate at a temperature of about 170° to 180° C. when the gas development begins.

It can thus be seen that crosslinking will begin right at or not far downstream from this injection point for the peroxide while foaming begins right at the end of channel 14, near mouth 6, where the temperature reaches 180° C. to 190° C. Crosslinking is well in progress when the foaming agent begins to decompose so that cells are formed from partially crosslinked material. Foaming is completed in the plastic hose 10 as laid around tube 9 but crosslinking (curing) may still continue.

The specific weight of the foamed and crosslinked layer of jacket 10 will be less than 200 g/cm$^3$ and its strength will be about 5 Newtons per mm. This strength value is maintained even at temperatures up to 130° C. on account of the crosslinking. In view of the low density, one obtains a coefficient for the thermal transmission of 0.06 watts per square meter and degree centigrade. The tube so made is quite flexible, and did not form folds even when tightly bent, nor was the foam crushed.

It should be noted that the invention establishes a rather narrow range of overlap of crosslinking and foaming. That overlap can be extended by keeping the thermoplastic at a temperature below blowing but above reaction for crosslinking through extensive heating correspondingly early injection of the crosslinking agent is another parameter here. Decisive however, it that the blend melts completely without the presence of the crosslinking agent. The choice of crosslinking peroxides is also important and can be regarded another parameter. A low reaction temperature makes sure that the substance is crosslinked already to a considerable degree when foaming starts.

In all instances, foaming begins when the plastic is already very viscous, which was found to be very important for obtaining a high degree of foaming and uniform porosity. Moreover, the absence of peroxide in the extruder during melting makes particularly sure that the foaming agent is very uniformly distributed in the melt. The choice of the foaming agent above is particularly advantageous for that purpose. The extruder worm 3 may include blending and shearing elements for further enhencing uniformity in the melting substance. The scorch sensitivity of the peroxide does not have to be considered at that point.

It may be of advantage to add a lubricant to the plastic mixture, just sufficient to impede, even prevent undue adhesion of the blend to the surface of the mandrel. Without such lubricant more or less permanent deposits of differing thickness could be found on the mandrel. These deposits reduce locally the shearing range and its dimensions so that the shearing intensity becomes non-uniform along the mandrel which, in turn, modifies the rate of heating and that, in turn, renders the crosslinking non-uniform. A lubricant could, for example, be amides or metal salts of higher carbon acids ($C_{14}-C_{18}$) at a proportion of about 0,2 parts by weight per hundred parts by weight polyethylene.

Generally speaking, the shear head raises the temperature of the plastic by about 30° to 40° which is more than the temperature spread for the onset of crosslinking and foaming. To that extent, these processes run consecutively and any overlap occurs practically only outside of the chamber 14, i.e. upon and after forming the jacket onto and around the tube.

The invention is not limited to the embodiments described above but all changes and modifications thereof not constituting departures from the spirit and scope of the invention are intended to be included.

I claim:

1. Method of jacketing a tube with a foamed, thermal insulation, and including providing a thermoplastic resin powder or granulate, conveying and heating the thermoplastic resin powder or granulate in a device such as a screw extruder in order to melt the powder or granulate; feeding the heated thermoplastic melt from the device into a shear head which includes a fast rotating, hollow mandrel for further heating the plastic, the tube passing through the hollow mandrel, the melt being shaped and discharged from the shear head onto and around the tube as the tube emerges from the mandrel, the improvement comprising:
    adding a chemical blowing agent to the thermoplastic melt prior to said feeding step for rendering the melt foamable, said blowing agent reaching a decomposition temperature for subsequently obtaining foaming just prior to the discharge of the foamable, plastic melt onto and around the tube; and
    adding a cross-linking agent to the foamable, plastic melt when inside said shear head and at a location in the shear head in which the thermoplastic has a temperature so that it is completely melted, but the temperature of the thermoplastic, as further heated in the shear head, has not yet reached said decomposition temperature of said chemical blowing agent at said location said cross-linking agent causing the plastic to begin cross-linking at a temperature below said decomposition temperature.

2. The method as in claim 1, said extruder feeding said thermoplastic to the shear head at a temperature being at least approximately a temperature in which crosslinking begins.

3. The method as in claim 1, said first adding step being carried out prior to heating in the extruder.

4. The method as in claim 1, said second adding step being carried out at a location opposite a point for feeding the shear head with the thermoplastic.

5. The method as in claim 1, wherein the crosslinking agent is added to the thermoplastic, polymer or blend when the latter has already a temperature at or in excess of the reaction temperature for the crosslinking agent.

6. The method as in claim 1, said thermoplastic being a blend of high and low density polyethylene.

7. The method as in claim 5, said crosslinking agent being a peroxide.

8. A method of jacketing a tube with foamed plastic for thermally insulating the tube, using a blend of high- and low-density poly-ethylene, comprising the steps of:
    adding a blowing agent to the blend, the blowing agent having a higher decomposition temperature than the melting point of the high-density polyethylene;
    raising the temperature of the blend, as blended with the blowing agent, to a temperature well above the melting point of the high-density polyethylene so that the blend is completely melted:
    adding to the heated and completely melted blend, in a second adding step, a peroxide as a cross-linking agent having a reaction temperature below the temperature that the blend has when the cross-linking agent is added, the reaction temperature being well below said decomposition temperature so that the cross-linking reaction begins right after the second adding step;
    continuously heating the blend after the second adding step by means of shear forces applied to the melted blend and in a channel surrounding said tube, the heating to continue up to a temperature above said decomposition temperature; and
    depositing a tube-like envelope of the heated blend onto the tube as foaming begins and cross-linking continues.

9. The method as in claim 5 or 8, said crosslinking agent being selected from the group consisting of dibenzoylperoxide; 1,1 ditertiary butylperoxi-3,3,5 trimethyl-cyclohexane; and tertiary butylperbenzoate.

10. The method as in claim 1 or 8, said blowing agent being azodicarbonamide.

11. The method as in claim 1 or 8, and including adding a lubricant.

* * * * *